(12) United States Patent
Anilovich et al.

(10) Patent No.: US 8,984,867 B2
(45) Date of Patent: Mar. 24, 2015

(54) NITROGEN DIOXIDE GENERATION DIAGNOSTIC FOR A DIESEL AFTER-TREATMENT SYSTEM

(75) Inventors: Igor Anilovich, Walled Lake, MI (US); John Coppola, Highland, MI (US); Janean E. Kowalkowski, Northville, MI (US); John F. Van Gilder, Webberville, MI (US); Ognyan N. Yanakiev, Birmingham, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 359 days.

(21) Appl. No.: 13/442,924

(22) Filed: Apr. 10, 2012

(65) Prior Publication Data

US 2013/0263591 A1    Oct. 10, 2013

(51) Int. Cl.

| | |
|---|---|
| *F01N 3/20* | (2006.01) |
| *F01N 3/021* | (2006.01) |
| *F01N 3/10* | (2006.01) |
| *F01N 11/00* | (2006.01) |
| *F01N 13/02* | (2010.01) |

(52) U.S. Cl.
CPC .............. *F01N 3/021* (2013.01); *F01N 3/103* (2013.01); *F01N 3/2066* (2013.01); *F01N 11/00* (2013.01); *F01N 13/02* (2013.01); *F01N 2340/06* (2013.01); *F01N 2560/026* (2013.01); *Y02T 10/24* (2013.01); *Y02T 10/47* (2013.01)
USPC .............................................. 60/295; 60/301

(58) Field of Classification Search
CPC ........... F01N 3/10; F01N 3/20; F01N 3/2066; F01N 11/00; F01N 2560/026
USPC ............................................. 60/295, 301, 303
See application file for complete search history.

(56) References Cited

U.S. PATENT DOCUMENTS

| | | | |
|---|---|---|---|
| 5,337,555 | A | 8/1994 | Tokuda et al. |
| 5,845,487 | A | 12/1998 | Fraenkle et al. |

(Continued)

FOREIGN PATENT DOCUMENTS

| | | |
|---|---|---|
| DE | 102007003547 A1 | 4/2008 |
| JP | 2005307769 A | 11/2005 |

*Primary Examiner* — Kenneth Bomberg
*Assistant Examiner* — Jonathan Matthias
(74) *Attorney, Agent, or Firm* — Quinn Law Group, PLLC

(57) ABSTRACT

A method for assessing $NO_2$ generation efficiency in a diesel engine after-treatment (AT) system having a diesel oxidation catalyst (DOC) downstream of the engine generating the $NO_2$ and a selective catalytic reduction (SCR) catalyst downstream of the DOC converting $NO_X$ with the aid of the $NO_2$. Engine exhaust gas flow is passed into the AT system and a reductant is injected into the gas flow between the DOC and the SCR catalyst. SCR inlet gas flow temperature is monitored during transient engine operation and DOC inlet and SCR catalyst outlet $NO_X$ concentrations are detected when the SCR catalyst inlet gas flow temperature is in a predetermined range. SCR catalyst $NO_X$ conversion efficiency is determined using the detected DOC inlet and SCR catalyst outlet concentrations of $NO_X$. Additionally, whether the $NO_2$ generation efficiency is at or above threshold efficiency is assessed by comparing the determined and threshold $NO_X$ conversion efficiencies.

20 Claims, 2 Drawing Sheets

(56) References Cited

U.S. PATENT DOCUMENTS

| | | |
|---|---|---|
| 2001/0054282 A1 | 12/2001 | Lang et al. |
| 2006/0260297 A1* | 11/2006 | Koch ............................. 60/286 |
| 2010/0043397 A1 | 2/2010 | Wang et al. |
| 2012/0006002 A1* | 1/2012 | Hagimoto et al. ............. 60/274 |
| 2012/0060476 A1 | 3/2012 | Pfister |

* cited by examiner

NITROGEN DIOXIDE GENERATION DIAGNOSTIC FOR A DIESEL AFTER-TREATMENT SYSTEM

TECHNICAL FIELD

The present disclosure is drawn to a system and a method for assessing nitrogen dioxide ($NO_2$) generation efficiency in a diesel engine after-treatment (AT) system.

BACKGROUND

Various exhaust after-treatment devices, such as particulate filters and other devices, have been developed to effectively limit exhaust emissions from internal combustion engines. In the case of compression-ignition or diesel engines, a great deal of effort continues to be expended to develop practical and efficient devices and methods to reduce emissions of largely carbonaceous particulates otherwise present in the engine's exhaust gas.

An after-treatment (AT) system for a modern diesel engine exhaust typically incorporates a diesel oxidation catalyst (DOC) as one of the devices for such a purpose. A DOC generally contains precious metals, such as platinum and/or palladium, which serve as catalysts to oxidize hydrocarbons and carbon monoxide present in the exhaust flow into carbon dioxide and water. The DOC may be used to convert nitrogen monoxide (NO) that is emitted in the engine's exhaust gas stream into nitrogen dioxide ($NO_2$).

An exhaust AT system may also employ a chemical process known as selective catalytic reduction (SCR) for converting oxides of nitrogen ($NO_X$) with the aid of the $NO_2$ generated by the DOC, a catalyst, and a reductant into diatomic nitrogen ($N_2$) and water ($H_2O$). The reductant, which may be an aqueous solution of urea, is generally injected into the engine's exhaust stream during engine operation in proportion to consumption of the engine's fuel. Once in the exhaust stream, the reductant is absorbed onto the system's SCR catalyst where the conversion of $NO_X$ takes place.

SUMMARY

A method of assessing nitrogen dioxide ($NO_2$) generation efficiency in a diesel engine after-treatment (AT) system having a diesel oxidation catalyst (DOC) arranged downstream of the engine and configured to generate the $NO_2$ and a selective catalytic reduction (SCR) catalyst arranged downstream of the DOC and configured to convert oxides of nitrogen ($NO_X$) into diatomic nitrogen ($N_2$) and water ($H_2O$) with the aid of the generated $NO_2$. The method includes passing the exhaust gas flow from the engine into the AT system, injecting a controlled amount of a reductant into the exhaust gas flow at a location in the AT system downstream of the DOC and upstream of the SCR catalyst.

The method also includes monitoring temperature of the exhaust gas flow at the SCR catalyst inlet during transient engine operation and detecting a concentration of NO at the inlet of the DOC and a concentration of NO at the outlet of the SCR catalyst as the engine continues transient operation and the temperature of the exhaust gas flow at the SCR catalyst inlet is in a predetermined range. The method also includes determining a SCR catalyst conversion efficiency of $NO_X$ by using the detected concentrations of NO at the inlet of the DOC and at the outlet of the SCR catalyst. The method additionally includes assessing whether the $NO_2$ generation efficiency in the AT system is at or above a threshold $NO_2$ generation efficiency by comparing the determined conversion efficiency of $NO_X$ with a threshold conversion efficiency of $NO_X$.

The engine may include an exhaust manifold configured to receive the exhaust gas flow from the engine, a turbocharger connected to the exhaust manifold and configured to pass the exhaust gas flow from the exhaust manifold into the AT system. In such a case, the DOC may be close-coupled to the turbocharger.

The DOC may be determined to have failed if the $NO_2$ generation efficiency in the AT system is below the threshold $NO_2$ generation efficiency. According to the method, a signal may also be generated indicative of the DOC having failed.

According to the method, each of the acts of injecting the reductant into the exhaust gas flow, determining the conversion efficiency of NO by the SCR catalyst; assessing whether the $NO_2$ generation efficiency in the AT system is at or above a threshold $NO_2$ generation efficiency, and generating the signal that the DOC has failed may be accomplished by a controller.

The act of detecting the concentration of $NO_X$ at the inlet of the DOC may be accomplished via a first $NO_X$ sensor arranged in electric communication with the controller. Furthermore, the act of detecting the concentration of $NO_X$ at the outlet of the SCR catalyst may be accomplished via a second $NO_X$ sensor arranged in electric communication with the controller.

The act of assessing whether the $NO_2$ generation efficiency in the AT system is at or above a threshold $NO_2$ generation efficiency may include modifying operation of the engine intrusively by the controller. Such intrusive modification of the engine operation may be accomplished by at least one of regulating a flow of exhaust gas recirculation (EGR) and the amount of the reductant.

The reductant may be urea that is injected into a passage configured to direct the exhaust gas flow from the DOC to the SCR catalyst.

The act of determining the conversion efficiency of $NO_X$ by the SCR catalyst may be determined by averaging the detected concentrations of $NO_X$.

The temperature of the exhaust gas flow at the SCR catalyst may be in the range of approximately 190-215 degrees Celsius.

A system for assessing nitrogen dioxide ($NO_2$) generation efficiency in the AT system and a vehicle employing such a system are also provided.

The above features and advantages, and other features and advantages of the present disclosure, will be readily apparent from the following detailed description of the embodiment(s) and best mode(s) for carrying out the described invention when taken in connection with the accompanying drawings and appended claims.

DETAILED DESCRIPTION

Figure 1:
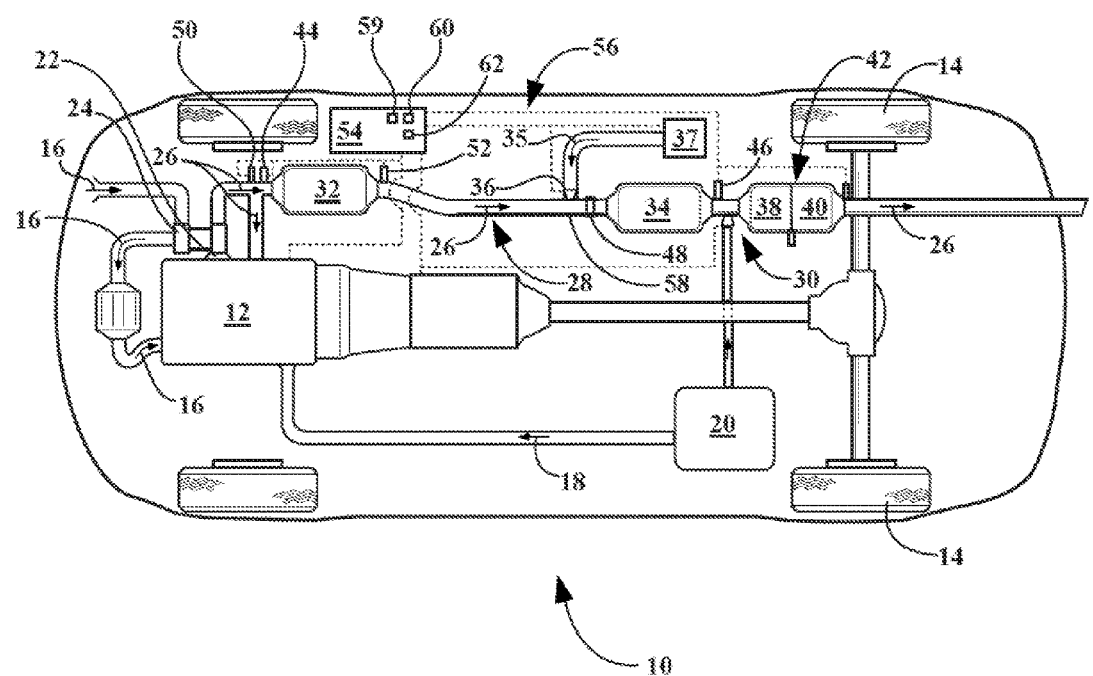
FIG. 1 is a schematic plan view of a vehicle having a diesel engine connected to an exhaust system having an after-treatment (AT) system for reducing exhaust emissions.

Referring to the drawings, wherein like reference numbers refer to like components throughout the several views, FIG. 1 schematically depicts a motor vehicle 10. The vehicle 10 includes a compression-ignition or diesel internal combustion engine 12 configured to propel the vehicle via driven wheels 14. Internal combustion in the diesel engine 12 occurs when a specific amount of ambient air flow 16 is mixed with a metered amount of fuel 18 supplied from a fuel tank 20 and the resultant air-fuel mixture is compressed inside the engine's cylinders (not shown).

As shown, the engine 12 includes an exhaust manifold 22 and a turbocharger 24. The turbocharger 24 is energized by an exhaust gas flow 26 that is released by individual cylinders of the engine 12 through the exhaust manifold 22 following each combustion event. The turbocharger 24 is connected to an exhaust system 28 that receives exhaust gas flow 26 and eventually releases the gas flow to the ambient, typically on a side or aft of the vehicle 10. Although the engine 12 is depicted as having the exhaust manifold 22 attached to the engine structure, the engine may include exhaust passages (not shown) such as generally formed in exhaust manifolds. In such a case, the above passages may be incorporated into the engine structure, such as the engine's cylinder head(s). Furthermore, although the turbocharger 24 is shown, nothing precludes the engine 12 from being configured and operated without such a power augmentation device.

The vehicle 10 also includes a diesel engine after-treatment (AT) system 30. The AT system 30 includes a number of exhaust after-treatment devices configured to methodically remove largely carbonaceous particulate byproducts of engine combustion from the exhaust gas flow 26 and reduce emissions of such particulates into the atmosphere. As shown, the AT system 30 operates as part of the exhaust system 28, and includes a diesel oxidation catalyst (DOC) 32. The DOC 32 is configured to generate nitrogen dioxide ($NO_2$), which is required by a selective catalytic reduction (SCR) catalyst 34 that is arranged downstream of the DOC 32. Generally, with respect to generation of $NO_2$, the DOC 32 becomes activated and reaches operating efficiency at elevated temperatures. Therefore, as shown in FIG. 1, the DOC 32 may be close-coupled to the turbocharger 24 in order to reduce loss of thermal energy from the exhaust gas flow 26 prior to the gas reaching the DOC.

The SCR catalyst 34, on the other hand, is configured to convert oxides of nitrogen ($NO_X$) into diatomic nitrogen ($N_2$) and water ($H_2O$) with the aid of the $NO_2$ generated by the DOC 32. The SCR conversion process additionally requires a controlled or metered amount of a reductant having a general name of "diesel-exhaust-fluid" (DEF) 35 when the reductant is employed in diesel engines. The DEF 35 may be an aqueous solution of urea that includes water and ammonia ($NH_3$). The DEF 35 is introduced into the exhaust gas flow 26 via an injector 36 from a reservoir 37 at a location in the AT system 30 that is downstream of the DOC 32 and upstream of the SCR catalyst 34. Accordingly, the DEF 35 accesses the SCR catalyst 34 as the exhaust gas flow 26 flows through SCR catalyst. An inner surface of the SCR catalyst 34 includes a wash coat that serves to attract the DEF such that the DEF may interact with the exhaust gas flow 26 in the presence of the $NO_2$ and generate a chemical reaction to reduce NO emissions from the engine 12. For effective conversion of $NO_X$ in the SCR catalyst 34, approximately 2.0-2.5 grams of urea is typically injected into the exhaust gas flow per 1 gram of $NO_X$.

The structural integrity of the wash coat inside the SCR catalyst 34 is a major factor responsible for the operating efficiency of the SCR catalyst. The wash coat may become degraded as a result of thermal stress generated by the exhaust gas flow 26 such that the wash coat becomes incapable of retaining the DEF 35 on the inner surface of the SCR catalyst 34. Accordingly, when the wash coat becomes degraded, the chemical reaction necessary to reduce NO emissions from the engine 12 cannot be sustained and, as a result, the operating efficiency of the SCR catalyst 34 also suffers.

After the SCR catalyst 34, the exhaust gas flow 26 proceeds to a second diesel oxidation catalyst (DOC) 38 arranged in tandem with and upstream of a diesel particulate filter (DPF) 40. The DOC 38 and DPF 40 are housed inside a canister 42. The DOC 38 is configured to oxidize hydrocarbons and carbon monoxide present in the exhaust gas flow 26 into carbon dioxide ($CO_2$) and water. The DPF 40 is configured to collect and dispose of the sooty particulate matter emitted by the engine 12 prior to the exhaust gas flow 26 being discharged to the atmosphere. Accordingly, the DPF 40 acts as a trap for removing the particulate matter, specifically, non-methane hydrocarbons (NMHC), from the exhaust flow. Each of the DOC 38 and the DPF 40 typically contains precious metals, such as platinum and/or palladium, which function as catalysts in the subject devices to accomplish their respective objectives. After passing through the DOC 38 and DPF 40 inside the canister 42, the exhaust gas flow 26 is deemed to be sufficiently cleaned of the noxious particulate matter and may then be allowed to exit the exhaust system 28 to the atmosphere.

The AT system 30 also includes a first $NO_X$ sensor 44 configured to sense a quantity of $NO_X$ at the inlet to the DOC 32 and a second $NO_X$ sensor 46 configured to sense a quantity of $NO_X$ at the outlet of the SCR catalyst 34. The AT system 30 also includes at least one DEF mixer 48 configured to blend the DEF with the exhaust gas flow 26 inside the exhaust system 28. The AT system 30 additionally includes a first temperature probe 50 configured to sense an inlet temperature of the DOC 32 and a second temperature probe 52 configured to sense an outlet temperature of the DOC 32. Furthermore, the AT system 30 includes a controller 54. The controller 54 may be a stand-alone unit, or be part of an electronic controller that regulates the operation of engine 12. Additionally, the controller 54 is programmed to regulate operation of the engine 12, as well as operation of the exhaust after-treatment devices, namely the DOC 32, SCR catalyst 34, DOC 38, and DPF 40. Each of the injector 36, the first and second $NO_X$ sensors 44, 46, and the first and second temperature probes 50, 52 is in electrical communication with the controller 54 in order to facilitate regulation of the AT system 30 by the controller.

The vehicle 10 also includes a system 56 configured to assess and diagnose $NO_2$ generation efficiency in the DOC 32. The system 56 includes the DOC 32, the SCR catalyst 34, the injector 36, the first and second $NO_X$ sensors 44, 46, the first and second temperature probes 50, 52, the at least one DEF mixer 48, as well as the controller 54. The system 52 also includes a passage 58 that is part of the exhaust system 28 and configured to carry the DEF 35 blended with the exhaust gas flow 26 to the SCR catalyst 34. As part of the role the controller 54 plays in the operation of system 56, the controller is additionally programmed to perform a diagnostic of the $NO_2$ generation efficiency in the AT system 30, specifically within the DOC 32. As part of performing the diagnostic, the controller 54 regulates operation of the injector 36 to introduce the DEF 35 into the exhaust gas flow 26. The controller 54 also monitors temperature of the exhaust gas flow 26 at the inlet to the SCR catalyst 34 via the first temperature probe 50 during transient operation of the engine 12 to verify that the inlet SCR catalyst 34 temperature is in a predetermined range 59.

Generally, during transient engine operation temperature of the exhaust gas flow 26 is generally lower than during the majority of instances of steady state engine operation, such as when the engine is requested to accelerate the vehicle. Transient operation of an internal combustion engine, whether diesel or gas, is typically defined as unsteady engine operation when each of the combustion cycle duration, the peak cylinder temperatures and pressures, and the frequency and duration of the transient behavior itself in the subject engine is varied. Transient engine operation frequently takes place when demand on the engine is switched from accelerating the host vehicle to maintaining steady vehicle speed or to vehicle coast down and braking Overall, transient engine operation may take place during situations when demands on engine speed and power and/or engine operating conditions are being reduced or otherwise varied.

The transient engine operation together with reduced temperature of the exhaust gas flow 26 is capable of permitting a more effective diagnostic of $NO_2$ generation efficiency in the DOC 32. The more effective diagnosis by the controller 54 is permitted because at such operating conditions the DEF 35 has a predominant effect over other, contributory sources of $NO_2$ to the exhaust gas flow 26 on the conversion efficiency of $NO_X$ by the SCR catalyst 34. In other words, at lower temperatures $NO_X$ conversion in the SCR catalyst 34 is more dependent on the appropriate amount of $NO_2$ being generated by the DOC 32. Pursuant to the above, the predetermined temperature range 59 of the exhaust gas flow 26 at the SCR catalyst 34 inlet during transient engine operation may be approximately 250 degrees Celsius or below, and more specifically approximately 190-215 degrees Celsius.

The controller 54 is additionally programmed to detect a concentration of $NO_X$, typically in parts per million (PPM) by volume of exhaust gas flow 26, at the inlet of the DOC 32 via the first $NO_X$ sensor 44. The controller 54 additionally detects a concentration of $NO_X$ at the outlet of the SCR catalyst 34 via the second $NO_X$ sensor 46. Detection of each of the concentrations of $NO_X$ via the first and second $NO_X$ sensors 44, 46 is performed as the engine 12 continues its transient operation when the temperature of the exhaust gas flow 26 at the inlet to the SCR catalyst 34, as sensed via first temperature probe 50 is in the predetermined range 59. The controller 54 also programmed to determine a conversion efficiency of $NO_X$ by the SCR catalyst 34 using the detected concentrations of NO via the first and second NO sensors 44, 46. Furthermore, the controller 54 is programmed to assess whether the $NO_2$ generation efficiency in the AT system 30 is at or above a threshold $NO_2$ generation efficiency by comparing the determined conversion efficiency of $NO_X$ with a threshold conversion efficiency of NO 60. If the DOC 32 is determined to be operating at or above the threshold $NO_2$ generation efficiency, the DOC 38 is deemed to be functional and in no need of replacement.

The threshold conversion efficiency of $NO_X$ 60 for the SCR catalyst 34 may be established empirically by testing a verified highly efficient example of the SCR catalyst 34 being supplied with an appropriate amount of $NO_2$, and then having such value programmed into the controller 54. Furthermore, the threshold conversion efficiency of $NO_X$ 60 for the SCR catalyst 34 may be empirically correlated to the established threshold $NO_2$ generation efficiency of the DOC 32.

The controller 54 may also be programmed to inform service personnel and/or operator of the vehicle 10 regarding the state of operating efficiency of the DOC 32. Accordingly, in the event that the controller 54 determines that the actual SCR 34 catalyst conversion efficiency of $NO_X$ is below the threshold conversion efficiency of $NO_X$, the DOC 32 may be identified as having failed. In such a case, the controller 54 may additionally generate a sensory signal 62, for example via a predetermined numerical code, or a visual or audible display for service personnel and/or operator of the vehicle 10 that is indicative of the DOC 32 having failed.

Figure 2:
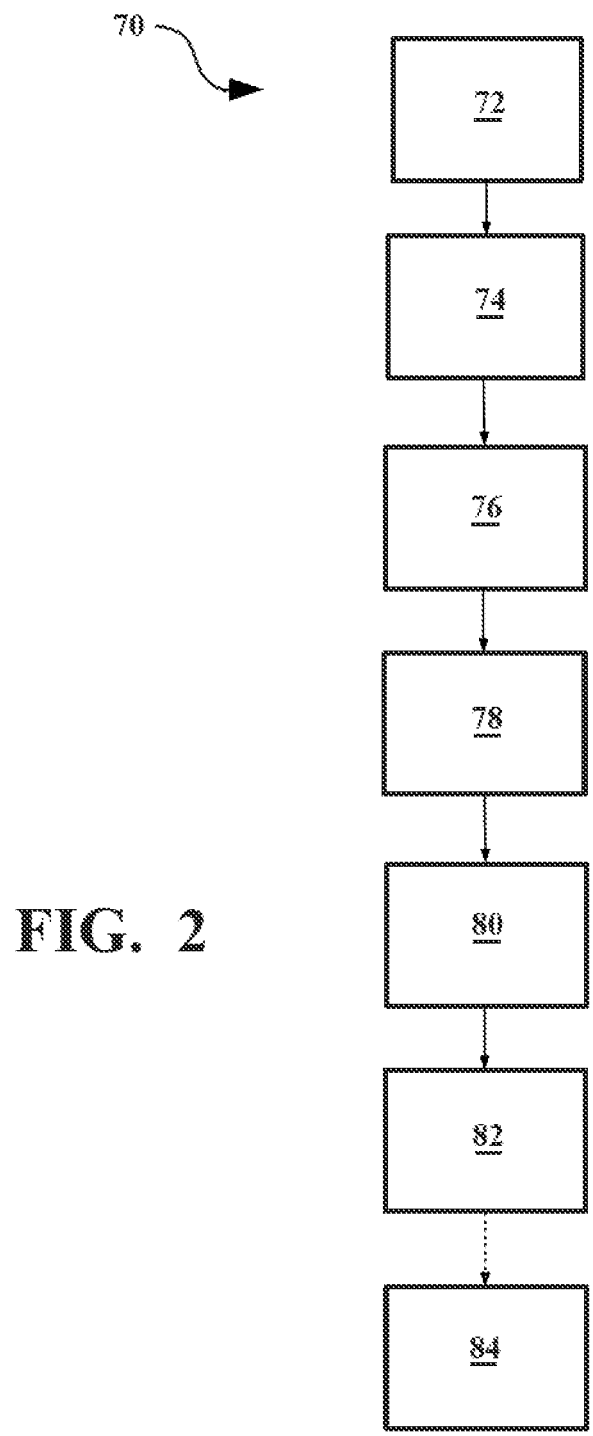
FIG. 2 is a flow diagram of a method for assessing nitrogen dioxide ($NO_2$) generation efficiency in the AT system of FIG. 1.

FIG. 2 depicts a method 70 of assessing nitrogen dioxide ($NO_2$) generation efficiency in the AT system 30, as described with respect to FIG. 1. Accordingly, the method commences in frame 72, where it includes passing the exhaust gas flow 26 from the engine 12 into the AT system 30. From frame 72, the method advances to frame 74, where the method includes injecting the reductant into the exhaust gas flow 26 downstream of the DOC 32 and upstream of the SCR catalyst 34 via the injector 36 that may be regulated by the controller 54. From frame 74 the method proceeds to frame 76. In frame 76 the method includes monitoring temperature of the exhaust gas flow at the SCR catalyst 34 during transient engine operation via the controller 54.

Following frame 76 the method proceeds to frame 78, where the method includes detecting the concentration of $NO_X$ at the inlet of the DOC 32 and the concentration of $NO_X$ at the outlet of the SCR catalyst 34 via the controller 54. As described above, the detection of concentration of $NO_X$ at the inlet and outlet of the SCR catalyst 34 is accomplished while the engine 12 continues transient operation and the temperature of the exhaust gas flow 26 at the SCR catalyst inlet is in the predetermined range 59. After frame 78 the method advances to frame 80, where the method includes determining the conversion efficiency of $NO_X$ by the SCR catalyst 34 via the controller 54 using the detected concentrations of $NO_X$ at the inlet of the DOC 32 and at the outlet of the SCR catalyst 34.

The controller 54 may determine the conversion efficiency of $NO_X$ by the SCR catalyst 34 by averaging all detected instantaneous concentrations of $NO_X$ accumulated during a specific timeframe over the number of detected samples. After the conversion efficiency of $NO_X$ by the SCR catalyst 34 has been determined in frame 80, the method moves on to frame 82. In frame 82 the method includes the controller 54 assessing whether the $NO_2$ generation efficiency in the AT system 30 is at or above a threshold $NO_2$ generation efficiency by comparing the determined conversion efficiency of $NO_X$ with the threshold conversion efficiency of $NO_X$ 60.

As part of assessing $NO_2$ generation efficiency in the AT system 30, the method 70 may additionally include controlling operation of the engine 12 intrusively, i.e., by actually modifying engine operation and performance, by the controller 54. Such intrusive control of the engine 12 may be accomplished via at least one of regulating a flow of exhaust gas recirculation (EGR) and the amount of the DEF 35 in order to assure that the engine 12 is operating in a predictable manner that is favorable for effective assessment of the $NO_2$ generation efficiency in the AT system 30. As used herein, the term "intrusively" means that the action is performed solely for diagnostics, i.e., only for the purpose of implementing the method 70, and not for controlling engine operation or engine emissions in response to an operator request.

Additionally, following frame 82 the method may advance to frame 84 where the controller 54 generates the sensory signal 62 indicative of the DOC 32 having failed if the generation efficiency in the AT system 30 is below the threshold $NO_2$ generation efficiency.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A system for assessing nitrogen dioxide ($NO_2$) generation efficiency in a diesel engine after-treatment (AT) system, the system for assessing $NO_2$ generation efficiency comprising:
   an exhaust manifold configured to receive the exhaust gas flow from the engine;
   a turbocharger connected to the exhaust manifold and configured to pass the exhaust gas flow from the exhaust manifold into the AT system, wherein the AT system includes a diesel oxidation catalyst (DOC) arranged downstream of the engine and configured to generate the $NO_2$, and a selective catalytic reduction (SCR) catalyst arranged downstream of the DOC and configured to convert oxides of nitrogen ($NO_X$) into diatomic nitrogen ($N_2$) and water ($H_2O$) with the aid of the generated $NO_2$; and
   a controller configured to:
      inject a reductant into the exhaust gas flow at a location in the AT system downstream of the DOC and upstream of the SCR catalyst;
      monitor temperature of the exhaust gas flow at the SCR catalyst inlet during transient engine operation;
      detect a concentration of $NO_X$ at the inlet of the DOC and a concentration of $NO_X$ at the outlet of the SCR as the engine continues transient operation and the temperature of the exhaust gas flow at the SCR catalyst inlet is in a predetermined range;
      determine a conversion efficiency of $NO_X$ by the SCR catalyst using the detected concentrations of $NO_X$ at the inlet of the DOC and at the outlet of the SCR catalyst; and
      assess whether the $NO_2$ generation efficiency in the AT system is at or above a threshold $NO_2$ generation efficiency by comparing the determined conversion efficiency of $NO_X$ with a threshold conversion efficiency of $NO_X$.

2. The system of claim 1, wherein the DOC is close-coupled to the turbocharger.

3. The system of claim 1, wherein the controller is additionally configured to identify the DOC as having failed if the $NO_2$ generation efficiency in the AT system is below the threshold $NO_2$ generation efficiency and generate a signal indicative of the DOC having failed.

4. The system of claim 3, further comprising a first $NO_X$ sensor and a second $NO_X$ sensor, each sensor arranged in electric communication with the controller, wherein the controller detects the concentration of $NO_X$ at the inlet of the DOC via the first $NO_X$ sensor and detects the concentration of $NO_X$ at the outlet of the SCR catalyst via a second $NO_X$ sensor.

5. The system of claim 1, wherein the controller is further configured to assesses whether the $NO_2$ generation efficiency in the AT system is at or above the threshold $NO_2$ generation efficiency by modifying operation of the engine intrusively.

6. The system of claim 1, further comprising a first temperature probe, wherein the controller monitors the temperature of the exhaust gas flow at the SCR catalyst inlet via the first temperature probe, and the predetermined range of the temperature of the exhaust gas flow at the SCR catalyst is 190-215 degrees Celsius.

7. A vehicle comprising:
   a diesel engine configured to propel the vehicle;
   an after-treatment (AT) system having a diesel oxidation catalyst (DOC) arranged downstream of the engine and configured to generate the $NO_2$ and a selective catalytic reduction (SCR) catalyst arranged downstream of the DOC and configured to convert oxides of nitrogen ($NO_X$) into diatomic nitrogen ($N_2$) and water ($H_2O$) with the aid of the generated $NO_2$;
   an exhaust manifold configured to receive the exhaust gas flow from the engine;
   a turbocharger connected to the exhaust manifold and configured to pass the exhaust gas flow from the exhaust manifold into the AT system; and
   a controller configured to:
      regulate injection of a reductant into the exhaust gas flow at a location in the AT system downstream of the DOC and upstream of the SCR catalyst;
      monitor temperature of the exhaust gas flow at the SCR catalyst inlet during transient engine operation;
      detect a concentration of $NO_X$ at the inlet of the DOC and a concentration of $NO_X$ at the outlet of the SCR catalyst as the engine continues transient operation and the temperature of the exhaust gas flow at the SCR catalyst inlet is in a predetermined range;
      determine a conversion efficiency of $NO_X$ by the SCR catalyst using the detected concentrations of $NO_X$ at the inlet of the DOC and at the outlet of the SCR catalyst; and
      assess whether the $NO_2$ generation efficiency in the AT system is at or above a threshold $NO_2$ generation efficiency by comparing the determined conversion efficiency of $NO_X$ with a threshold conversion efficiency of $NO_X$.

8. The vehicle of claim 7, wherein the DOC is close-coupled to the turbocharger.

9. The vehicle of claim 7, wherein the controller is additionally configured to identify the DOC as having failed if the $NO_2$ generation efficiency in the AT system is below the threshold $NO_2$ generation efficiency and generate a signal indicative of the DOC having failed.

10. The vehicle of claim 9, further comprising a first $NO_X$ sensor and a second $NO_X$ sensor, each sensor arranged in electric communication with the controller, wherein the controller detects the concentration of $NO_X$ at the inlet of the DOC via the first $NO_X$ sensor and detects the concentration of $NO_X$ at the outlet of the SCR catalyst via a second $NO_X$ sensor.

11. The vehicle of claim 7, wherein the controller is further configured to assesses whether the $NO_2$ generation efficiency in the AT system is at or above the threshold $NO_2$ generation efficiency by modifying operation of the engine intrusively.

12. The vehicle of claim 7, further comprising a first temperature probe, wherein the controller monitors the temperature of the exhaust gas flow at the SCR catalyst inlet via the first temperature probe, and the predetermined range of the temperature of the exhaust gas flow at the SCR catalyst is 190-215 degrees Celsius.

13. A method of assessing nitrogen dioxide ($NO_2$) generation efficiency in a diesel engine after-treatment (AT) system, the method comprising:
   passing the exhaust gas flow from the engine into the AT system, wherein the AT system includes a diesel oxidation catalyst (DOC) arranged downstream of the engine and configured to generate the $NO_2$, and a selective catalytic reduction (SCR) catalyst arranged downstream of the DOC and configured to convert oxides of nitrogen ($NO_X$) into diatomic nitrogen ($N_2$) and water ($H_2O$) with the aid of the generated $NO_2$;
   injecting a reductant into the exhaust gas flow at a location in the AT system downstream of the DOC and upstream of the SCR catalyst;
   monitoring temperature of the exhaust gas flow at the SCR catalyst inlet during transient engine operation;

detecting a concentration of $NO_X$ at the inlet of the DOC and a concentration of $NO_X$ at the outlet of the SCR catalyst as the engine continues transient operation and the temperature of the exhaust gas flow at the SCR catalyst inlet is in a predetermined range;

determining a conversion efficiency of $NO_X$ by the SCR catalyst using the detected concentrations of $NO_X$ at the inlet of the DOC and at the outlet of the SCR catalyst; and assessing whether the $NO_2$ generation efficiency in the AT system is at or above a threshold $NO_2$ generation efficiency by comparing the determined conversion efficiency of $NO_X$ with a threshold conversion efficiency of $NO_X$.

14. The method of claim 13, wherein the engine includes an exhaust manifold configured to receive the exhaust gas flow from the engine, and a turbocharger connected to the exhaust manifold and configured to pass the exhaust gas flow from the exhaust manifold into the AT system, and wherein the DOC is close-coupled to the turbocharger.

15. The method of claim 13, wherein the DOC is determined to have failed if the $NO_2$ generation efficiency in the AT system is below the threshold $NO_2$ generation efficiency, further comprising generating a signal indicative of the DOC having failed.

16. The method of claim 15, wherein each of said injecting the reductant into the exhaust gas flow, determining the conversion efficiency of $NO_X$ by the SCR catalyst; assessing whether the $NO_2$ generation efficiency in the AT system is at or above a threshold $NO_2$ generation efficiency, and generating the signal that the DOC has failed is accomplished by a controller.

17. The method of claim 16, wherein said detecting the concentration of $NO_X$ at the inlet of the DOC is accomplished via a first $NO_X$ sensor arranged in electric communication with the controller and the concentration of $NO_X$ at the outlet of the SCR catalyst is accomplished via a second $NO_X$ sensor arranged in electric communication with the controller.

18. The method of claim 16, wherein said assessing whether the $NO_2$ generation efficiency in the AT system is at or above a threshold $NO_2$ generation efficiency includes modifying operation of the engine intrusively by the controller.

19. The method of claim 13, wherein the reductant is urea that is injected into a passage configured to direct the exhaust gas flow from the DOC to the SCR catalyst.

20. The method of claim 13, wherein said determining the conversion efficiency of $NO_X$ by the SCR catalyst is determined by averaging the detected concentrations of $NO_X$.

* * * * *